(12) United States Patent
Gabrilovich et al.

(10) Patent No.: US 8,886,636 B2
(45) Date of Patent: Nov. 11, 2014

(54) CONTEXT TRANSFER IN SEARCH ADVERTISING

(75) Inventors: Evgeniy Gabrilovich, Sunnyvale, CA (US); Andrei Broder, Menlo Park, CA (US); Bo Pang, Sunnyvale, CA (US); Vanja Josifovski, Los Gatos, CA (US); Hila Becker, Plainview, NY (US)

(73) Assignee: Yahoo! Inc., Sunnyvale, CA (US)

( * ) Notice: Subject to any disclaimer, the term of this patent is extended or adjusted under 35 U.S.C. 154(b) by 1297 days.

(21) Appl. No.: 12/342,449

(22) Filed: Dec. 23, 2008

(65) Prior Publication Data

US 2010/0161605 A1    Jun. 24, 2010

(51) Int. Cl.
*G06F 7/00* (2006.01)
*G06F 17/30* (2006.01)
*G06Q 30/02* (2012.01)

(52) U.S. Cl.
CPC .......... *G06F 17/30731* (2013.01); *G06Q 30/02* (2013.01)
USPC .......................................... 707/723; 707/748

(58) Field of Classification Search
None
See application file for complete search history.

(56) References Cited

U.S. PATENT DOCUMENTS

| | | | |
|---|---|---|---|
| 7,523,087 B1 * | 4/2009 | Agarwal et al. ............... | 705/7.29 |
| 7,966,564 B2 * | 6/2011 | Catlin et al. ................... | 715/745 |
| 8,682,712 B2 * | 3/2014 | Khopkar et al. ............ | 705/14.26 |
| 2005/0038894 A1 * | 2/2005 | Hsu et al. ....................... | 709/228 |
| 2006/0069784 A2 * | 3/2006 | Hsu et al. ....................... | 709/228 |
| 2006/0212350 A1 * | 9/2006 | Ellis et al. ....................... | 705/14 |
| 2006/0224445 A1 * | 10/2006 | Axe et al. ......................... | 705/14 |
| 2007/0005418 A1 * | 1/2007 | Nishar et al. ..................... | 705/14 |
| 2007/0143296 A1 | 6/2007 | Casion | |
| 2007/0250468 A1 * | 10/2007 | Pieper ............................... | 707/1 |
| 2007/0271352 A1 | 11/2007 | Khopkar et al. | |
| 2007/0271392 A1 | 11/2007 | Khopkar et al. | |
| 2008/0027812 A1 * | 1/2008 | Hsu et al. ......................... | 705/14 |
| 2008/0103886 A1 * | 5/2008 | Li et al. ............................ | 705/14 |
| 2008/0103892 A1 * | 5/2008 | Chatwin et al. ................. | 705/14 |
| 2008/0104031 A1 | 5/2008 | Grasso | |
| 2008/0215563 A1 * | 9/2008 | Shi et al. ........................... | 707/5 |
| 2008/0243797 A1 | 10/2008 | Song et al. | |

(Continued)

FOREIGN PATENT DOCUMENTS

JP         2008-097351       4/2008
KR   10-2003-0063275       7/2003

OTHER PUBLICATIONS

International Search Report and Written Opinion, PCT Application No. PCT/US2009/064986, dated Jun. 10, 2010 (6 pages).

(Continued)

*Primary Examiner* — Tony Mahmoudi
*Assistant Examiner* — Tuan A Pham
(74) *Attorney, Agent, or Firm* — Brinks Gilson & Lione

(57) ABSTRACT

A computer-implemented method is disclosed for determining a type of landing page to which to transfer web searchers that enter a particular query, the method comprising: classifying a landing page as one of a plurality of landing page classes with a trained classifier of a computer based on textual content of the landing page; determining, by the computer, characteristics of one or more query to be associated with the landing page; and choosing, with the computer, whether to retain or to change classification of the landing page to be associated with the one or more query based on relative average conversion rates of advertisements on a plurality of manually-classified landing pages when associated with the characteristics of the one or more query.

20 Claims, 13 Drawing Sheets

(56) References Cited

U.S. PATENT DOCUMENTS

| | | | |
|---|---|---|---|
| 2008/0288303 A1* | 11/2008 | Gray et al. | 705/7 |
| 2009/0024554 A1* | 1/2009 | Murdock et al. | 706/48 |
| 2009/0112840 A1* | 4/2009 | Murdock et al. | 707/5 |
| 2009/0319517 A1* | 12/2009 | Guha et al. | 707/5 |

OTHER PUBLICATIONS

Hamilton, H.J., et al., "RIAC: A rule induction algorithm based on approximate classification," retrieved Dec. 23, 2008, from http://citeseerx.ist.psu.edu/viewdoc/summary?doi=10.1.1.7.7768, 2 pages (1996).

Wikipedia, "Precision and recall," retrieved Dec. 23, 2008, from http://en.wikipedia.org/wiki/Precision_and_recall, 4 pages.

Wikipedia, "Support vector machine," retrieved Dec. 23, 2008, from http://en.wikipedia.org/wiki/Support_vector_machine, 9 pages.

Wikipedia, "tf-idf," retrieved Dec. 23, 2008, from http://en.wikipedia.org/wiki/Tf-idf, 3 pages.

* cited by examiner

FIG. 5

CONTEXT TRANSFER IN SEARCH ADVERTISING

BACKGROUND

1. Technical Field

The disclosed embodiments relate to transferring web searchers or browsers to particular landing pages following an ad click based on query or web page content and on characteristics of the landing pages, and more particularly, correlation of landing page type with conversion data provided by advertisers.

2. Related Art

In recent years, online advertising has become an economic force that sustains numerous Internet services, ranging from major web search engines to obscure blogs. The standard approach to textual web advertising is based on modeling the user's needs and interests, and using this model to find suitable advertisements ("ads"). In Web search, numerous studies have focused on classifying the query intent and on retrieving the most relevant ads. However, little research has been devoted to what actually happens after an ad is clicked, the subject of the embodiments disclosed herein.

A large part of the Web advertising market consists of textual ads, the ubiquitous short text messages usually marked as "sponsored links." There are two main channels for distributing such ads. Sponsored search (or paid search advertising) places ads on the result pages of a web search engine, where ads are selected to be relevant to the search query. All major web search engines (Google, Microsoft, Yahoo!) support sponsored ads and act simultaneously as a web search engine and an ad search engine. Content match (or contextual advertising) places ads on third-party web pages based on subject matter content of those web pages. Today, almost all of the for-profit, non-transactional websites—those that do not directly sell anything—rely at least to some extent on contextual advertising revenue. Content match supports sites that range from individual bloggers and small niche communities to large publishers such as major newspapers. Herein, the focus is on sponsored search, but the classification of landing pages and correlation of conversion rates described below may be applied to content match as well.

Sponsored search includes interplay of three entities: advertisers, the search engine, and users or searchers that perform query search or simply browse. The advertiser provides the supply of ads. Usually the activity of the advertisers is organized around campaigns, which are defined by a set of ads with a particular temporal and thematic goal (e.g., sale of digital cameras during the holiday season). As in traditional advertising, the goal of the advertisers can be broadly defined as promotion of products or services. The search engine provides real estate for placing ads (e.g., allocates space on search results pages), and selects ads that are relevant to the user's query. Users visit the web pages and interact with the ads.

Sponsored search usually falls into the category of direct marketing (as opposed to brand advertising), that is, advertising whose aim is a direct response, where the effect of a campaign is measured by the user reaction (e.g., purchase of advertised goods or services). Compared to traditional media, one of the advantages of online advertising in general and sponsored search in particular is that it is relatively easy to measure the user response related thereto. Usually the desired immediate reaction is for the user to follow the link in the ad and visit the advertiser's website. However, the desired eventual outcome is for the user to perform a transaction on the advertised website, e.g., purchase a product or service being advertised. Therefore, evaluation methodology may be based on measuring conversion rate, which is the fraction of users who performed the advertised transaction among those who merely clicked on the advertisement.

The prevalent pricing model for textual ads is that the advertisers pay for every click on the advertisement (pay-per-click or "PPC"). There are also other models, such as pay-per-impression, where the advertiser pays for the number of exposures of an ad, and pay-per-action ("PPA"), where the advertiser pays only if the ad leads to a sale or similar completed transaction. In this paper we deal with the PPC model, which is most often used in practice.

The amount paid by the advertiser for each click is usually determined by an auction process. The advertisers place bids on a search phrase, and their position in the column of ads displayed on the search results page is determined by their bid. Thus, each ad is annotated with one or more bid phrases. In addition to the bid phrase, an ad also contains a title usually displayed in bold font, and a creative, which is a few lines of text, usually shorter than 120 characters, displayed on the page. Naturally, each ad contains a URL to the advertised web page, called the landing page.

In the model currently used by all the major search engines, bid phrases serve a dual purpose: they explicitly specify queries for which the ad should be displayed and simultaneously put a price tag on a click event. Obviously, these price tags could be different for different queries. For example, a contractor advertising his services on the Internet might be willing to pay a small amount of money when his ads are clicked from general queries such as home remodeling, but higher amounts if the ads are clicked from more focused queries such as hardwood doors or laminate flooring. Most often, ads are shown for queries that are expressly listed among the bid phrases for the ad, thus resulting in an exact match (i.e., identity) between the query and the bid phrase. However, it might be difficult (or even impossible) for the advertiser to list all the relevant queries ahead of time. Therefore, search engines can also analyze queries and modify them slightly in an attempt to match pre-defined bid phrases. This approach, called broad (or advanced) match, facilitates more flexible ad matching, but is also more error-prone, and only some advertisers opt for it. There are two bodies of prior research that are relevant to our study.

Online advertising is an emerging area of research, so the published literature is quite sparse. A recent study confirms the intuition that ads need to be relevant to the user's interest to avoid degrading the user's experience and increase the probability of reaction. In sponsored search, ads are triggered by the web search query, which is often just a few words long, and therefore selecting relevant ads based on such short input is difficult. One way to address this problem is to perform query expansion based on web search results, which can also be performed ahead of time for head (popular) and torso (rarer) queries.

There are several models of pricing online ads, which vary by the amount of risk shared by the advertiser and the publisher. Charging advertisers for ad displays (impressions) effectively places all of the risk with the advertiser, since the ads displayed might not even be relevant to the user. Charging in proportion to the conversion rate, which measures the proportion of users who actually committed to the advertised transaction, moves the risk almost entirely to the advertiser. Although many users perform a purchase in the same session when they click on the ad, many others will do so at a later time, having considered the worthiness of the transaction and conducting some research. In such cases, it becomes nearly impossible to relate the transaction to the initial ad click, making it very difficult to charge commensurately to the true conversion rate. The current practice of charging per click offers a middle ground between these two extremes, as paying per click lets the advertiser ascertain that the ad was at least somewhat relevant to the user, who expressed some interest by clicking on the ad. Due to this prevalence of charging per click, prior studies on forecasting user response to ads mostly focused on predicting the click-through rates based on estimated ad relevance as well as click history. In contrast, studies conducted herein focus on the true conversion rate.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 5 is a screenshot of an exemplary homepage.

DETAILED DESCRIPTION

By way of introduction, the disclosed embodiments relate to transferring searchers or browsers to particular landing pages following an advertisement ("ad") click based on query or web page content and on characteristics of the landing pages, and more particularly, correlation of landing page type (or taxonomy) with conversion data provided by advertisers. Herein is discussed the study of context transfer in terms of the transition from searching or browsing activity to different possible contexts found on a landing page after clicking on an advertisement. A careful choice of the type of context transfer may largely influence and explain subsequent conversions.

The ultimate goal of advertising is conversion, that is, the transformation of a consumer that has noticed the ad into a buyer of the product or service being advertised. Here, "buyer" should be construed in a general sense: in a political campaign, a "buy" is a vote for the candidate; for a car advertiser, a "buy" might be a test-drive at the dealership; and for an on-line publication or service, a "buy" might be a free subscription, etc.

Figure 1:
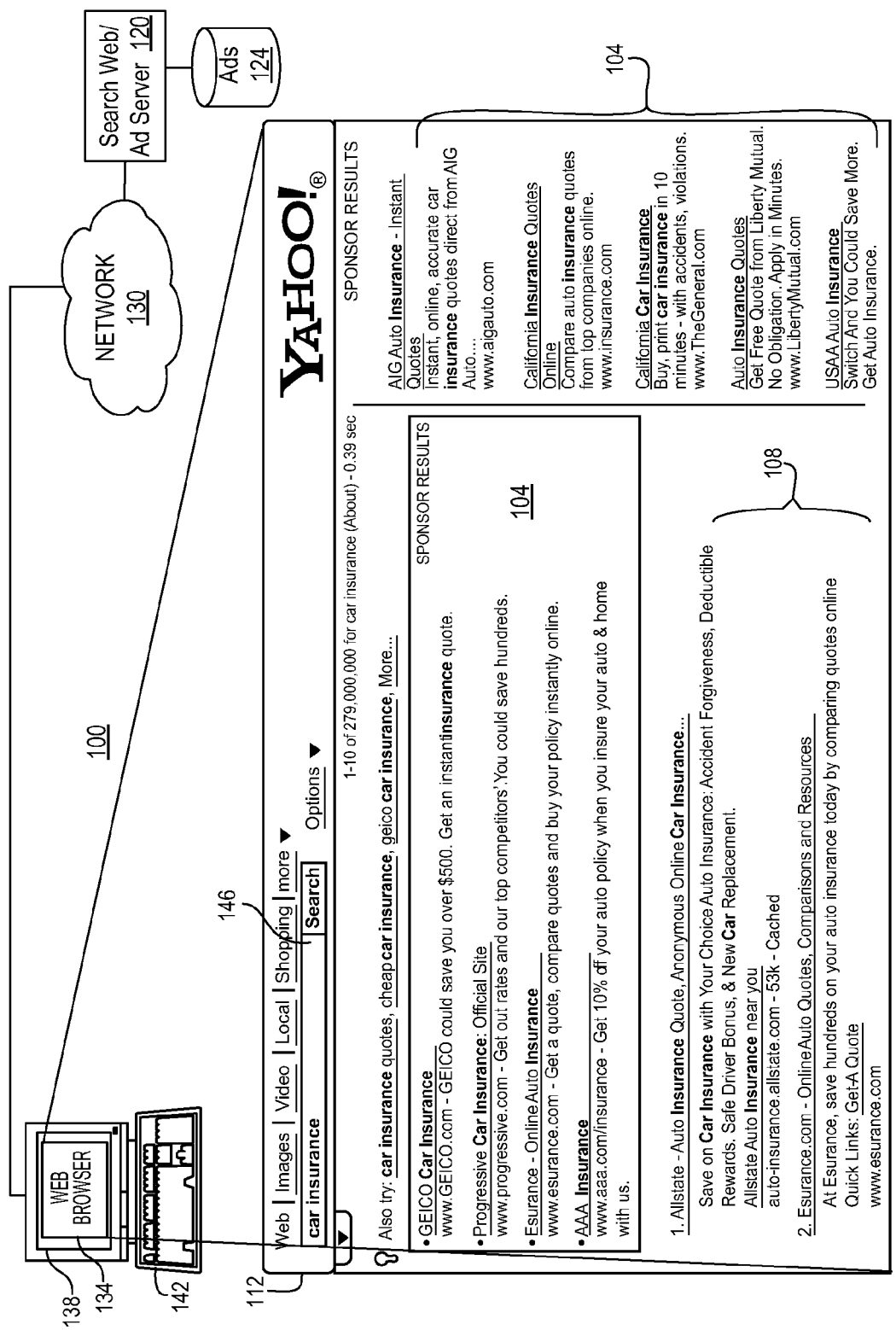
FIG. 1 is a block diagram of an exemplary system that delivers sponsored advertisements alongside organic advertisements to search result pages by a search web server.

FIG. 1 is a block diagram of an exemplary system 100 that delivers sponsored advertisements 104 alongside algorithmic (or organic) advertisements 108 to search result pages 112 by a search web/ad server 120. The search web/ad server 120 will be variably referred to herein as a search engine 120, which may include an ad server integrated therewith. The advertisements 104, 108 may be stored (indexed) in an ad database 124 of the search engine 120, and delivered over a network 130 such as the Internet, the World Wide Web ("Web"), a local area network (LAN), a wide area network (WAN), or other network 130. Sponsored advertisements will be the focus herein, although the embodiments disclosed may be applied to the organic advertisements 108, or to advertisements displayed on the search results page 112 reached by a web browser 134 of a user (or searcher). The web browser 134 may be displayed on a monitor 138 of a computing or communication device 142. The computing or communication device 142 may be a computer, a personal digital assistant ("PDA"), a Blackberry by Research in Motion (RIM), a mobile phone, a laptop, etc.

The search query submitted by the user in a search box 146 of the search result page 112 embodies the user's intent, and is the main trigger for selecting ads to display from the ad database 124. Once the search result page 112 is presented, a user becomes a "buyer" in two stages. The first stage is clickthrough and the second stage is conversion.

Figure 2:
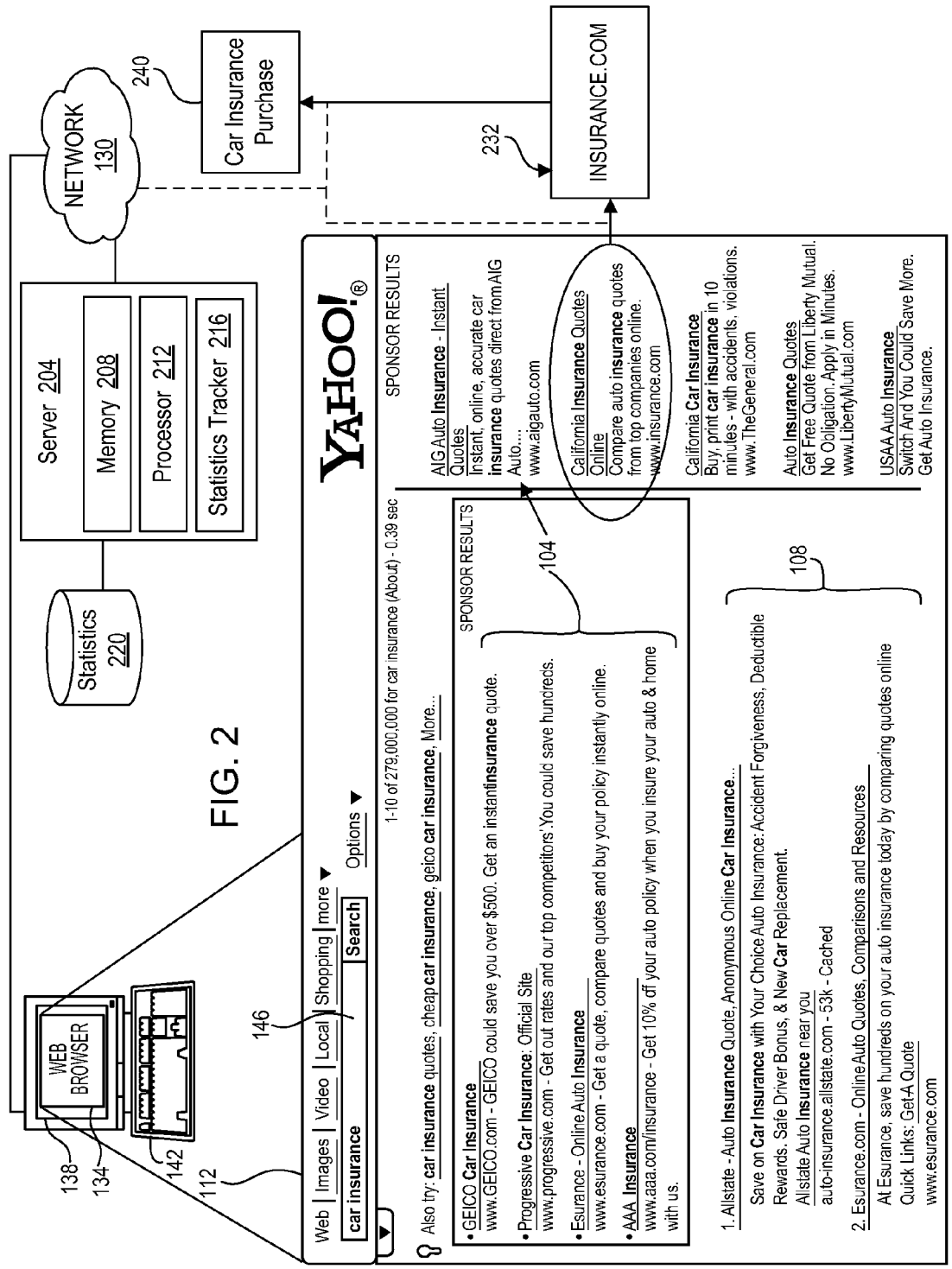
FIG. 2 is a block diagram of a server that interacts with the Web to gather and store statistics related to conversions from advertisements delivered as in FIG. 1.

FIG. 2 is a block diagram of a server 204 that interacts with the Web 130 to gather and store statistics related to conversions from advertisements delivered as in FIG. 1. The server 204 further includes a memory 208, a processor 212, and a statistics tracker 216. A statistics database 220 may be included in or otherwise coupled with the server 204 for storage of statistical information such as clickthroughs and conversions. Herein, the phrase "coupled with" is defined to mean directly connected to or indirectly connected through one or more intermediate components. Such intermediate components may include both hardware and software based components.

First, the user clicks on the advertisement ("ad") 104 that is displayed in response to a submitted query. As a result, the user, via the web browser 134, is transferred to a landing page 232 for this query/ad combination, which is the first page seen on the advertiser website. Usually, the advertisers pay the search engine 120 for every click on their ads—this is the cost-per-click or CPC model. The observed frequency according to which a particular ad is clicked for a particular query is called the "clickthrough" rate ("CTR"), which may be calculated based on the gathered statistics in the database 220.

At the conversion stage, the user, possibly after a certain amount of activity on the advertiser's website, becomes a buyer of the product or service being advertised. In FIG. 2, this is indicated at block 240 by a purchase made of car insurance. The observed frequency according to which clickers on a particular ad become buyers is called the conversion rate, which may be calculated based on gathered conversions saved in the statistics database 220. In some situations, the advertisers pay only for conversions. To emphasize that conversion can be a generic action, not only a monetary purchase, observed frequencies of conversions are called the cost-per-action ("CPA") model.

Understanding the conversion rate helps both search engines and advertisers to best target advertising efforts. In the CPC model, conversion rate may determine the advertisers' return on investment ("ROI") and informs the search engines 120 about the value of their product; in the CPA model, conversion rate may determine directly how much money changes hands.

Figure 5:
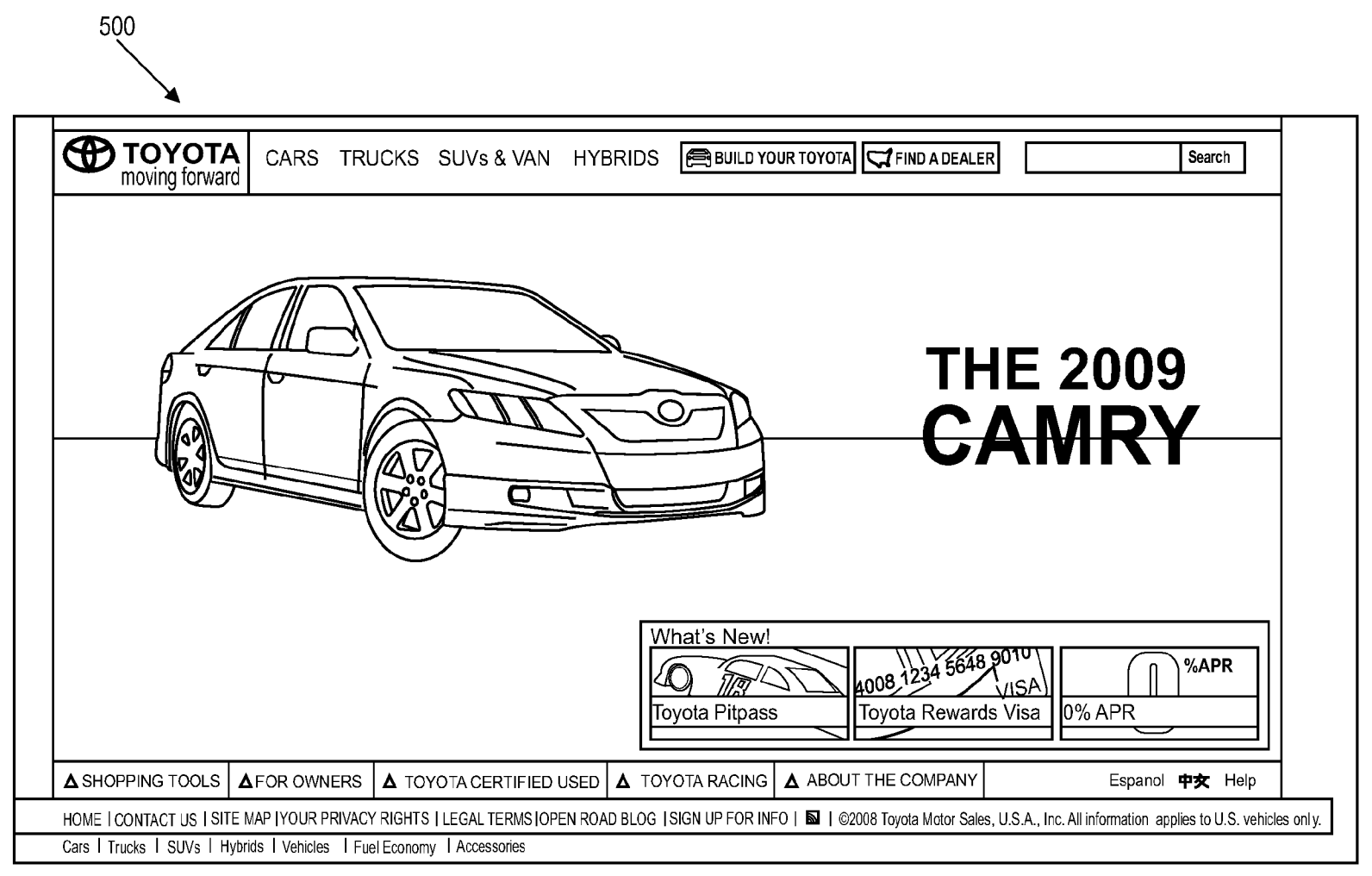

After reviewing several hundred ads and corresponding landing pages, a vast majority of the observed context transfers could be classified into one of the following three classes: (1) homepage (FIG. 5); (2) search transfer (FIG. 6); and (3) category browse (FIG. 7), which will be discussed in more detail below. Having a homepage as a landing page makes sense for smaller businesses that cannot afford or do not need more sophisticated structures, and for large online stores, which usually populate their homepage with daily promotions in addition to describing the variety of their offerings. A search transfer page includes results of a search conducted on the advertiser's website with the very same query submitted to the search engine 120 by the user. A search transfer page as a landing page 232 is suitable when a query can have multiple interpretations or is relevant to numerous offerings or the target website does not have a corresponding category. A category browse page includes a sub-catalog of products being offered on the advertiser's website. This is usually suitable for queries related to a meaningful group of products. The three classes of landing pages 232 discussed above include about 88% of all advertisements in a sample dataset.

Furthermore, the above-listed classes are readily distinguishable, allowing a high accuracy (80%) classifier (360 in FIGS. 3 and 4) to be built for them. Using this classifier, a study of correlation between the different types of landing pages 232 and the conversion rates of the corresponding ads was conducted, when the conversion rates were made available to the search engine 120 by advertisers. The final results are based on over 30,000 unique landing pages 232, automatically classified.

Also examined was the suitability of different classes of landing pages 232 for different classes of queries (e.g., queries of different lengths or on different topics). Interestingly, in the dataset of the present study, there seems to be little agreement among advertisers as to which landing page 232 to use for which query, as for many query types observed was actual use of a wide variety of landing pages 232. However, in many cases the existing choice of landing pages 232 was found to be sub-optimal.

Figure 3:
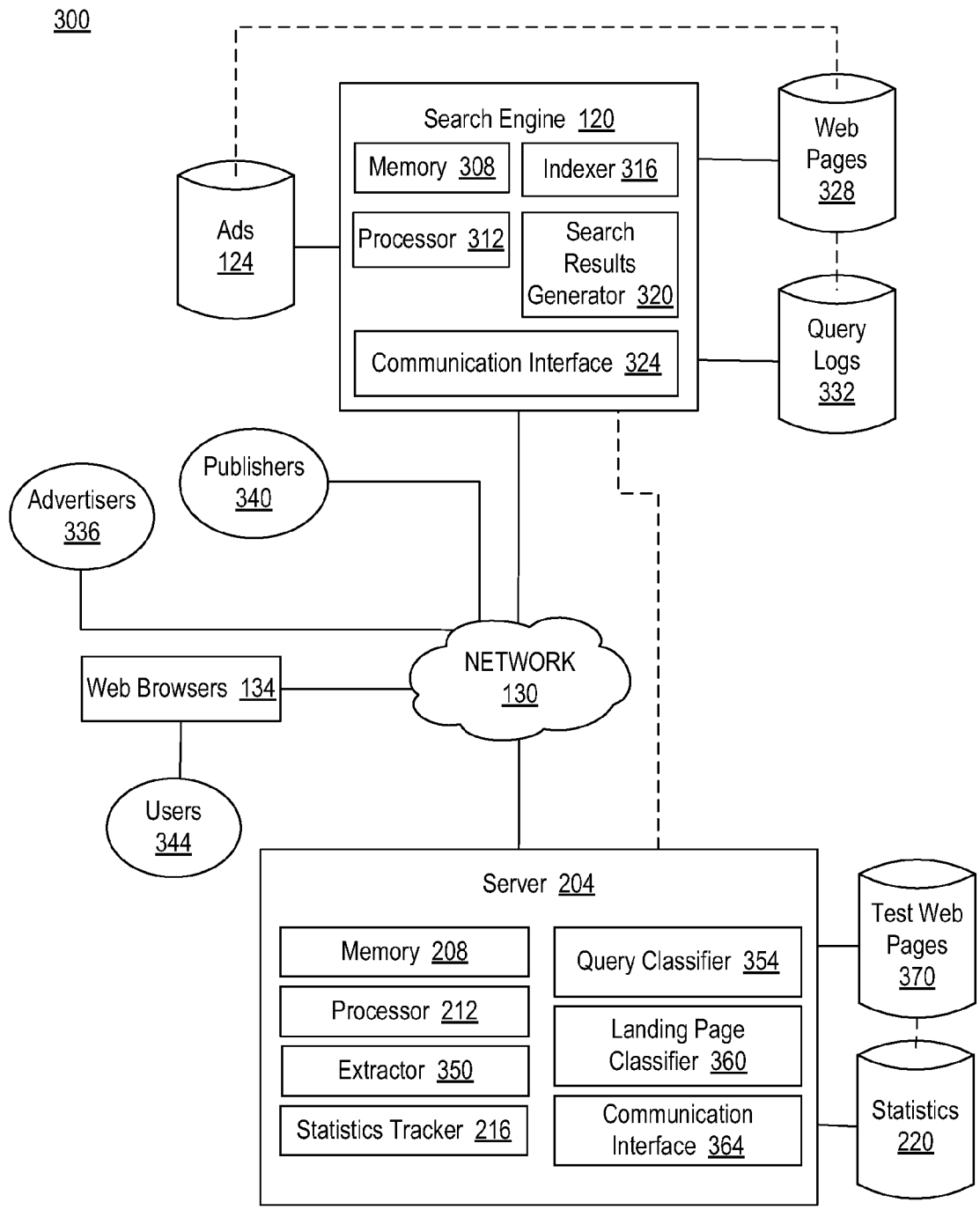
FIG. 3 is a block diagram of an exemplary system for classification of landing pages and enabling advertisers to choose a type of landing page based on correlated conversion rates therewith.

FIG. 3 is a block diagram of an exemplary system 300 for classification of landing pages 232 and enabling advertisers to choose a type of landing page 232 based on correlated conversion rates therewith. Some of the components of system 100 introduced above may exist within this exemplary system 300. The search engine 120, accordingly, may further include a memory 308, a processor 312, an indexer 316, a search results generator 320, and a communication interface 324. The search engine 120 may also include, or be coupled with, a web pages database 328, which may include the landing pages 232, and a query logs database 332 to store submitted queries. The search engine 120 may additionally include other hardware or software to enable its functioning as described herein. The indexer 316 may be used to index landing pages 232 as well as the sponsored (104) and organic (108) advertisements stored in the ads database 124. The advertisements may be saved in the ads database 124 in relation to related web pages in the web pages database 328. Likewise, the query logs 332 may store submitted queries in relation to the web pages in web pages database 328 returned in response thereto. Accordingly, the databases 124, 328, and 332 of FIG. 3 may be a single database or all coupled together as indicated by the dashed lines.

The system 300 may include a plurality of advertisers 336 and publishers 340, wherein an advertiser 336 may also be a publisher 340, and a plurality of users 344 that communicate through the web browsers 134 over the network 130 with the search engine 120. A search engine homepage (not shown) may be displayed in the web browser 134 of the communication device 142 of a user 344 to allow the user 344 to submit one or more queries. The search results generator 320 may then retrieve and rank web pages from the database 328 most relevant to the terms of the query. Together with the communication interface 324, the processor 312 delivers the ranked set of web pages to the search results page 112 as shown in FIG. 1. The submitted query may then be saved to the query logs database 332.

As discussed with reference to FIG. 2, interaction of the users 344 with the sponsored advertisements 104 delivered by the search engine 120 to the search results page 112 may lead to recording clickthroughs and, in some cases, conversions by the tracking server 204. Accordingly, the server 204 may be used to track statistics such as clickthroughs and conversions in order to calculate metrics such as CTR and conversion rates.

The server 204 may further include an extractor 350, a query classifier 354, a landing page classifier 360, and a communication interface 364. The server 204 may further include, or be coupled with, a test web pages database 370 and the statistics database 220, which may also be coupled together. Accordingly, in addition to tracking click and conversion-related statistics, the server 204 may also determine the type of landing page—homepage, search transfer, category browse, or other—that each web page is that is stored in the test web pages database 370. The extractor 350 may extract words or features from a landing page and feed those words of features to the landing page classifier 360, which in turns determines the class (or type) of the landing page 232. In the experiments conducted, a certain number of web pages were manually classified to produce a baseline and develop an induction algorithm, through machine learning, that could be used by the landing page classifier 360. After properly trained, the landing page classifier 360 was also able to properly classify other web pages without human intervention.

The conversion rates of certain types of landing pages 232 may be correlated with queries submitted to reach those landing pages 232. The query classifier 354, accordingly, may also be employed to retrieve queries from the query logs database 332, classify the query with respect to a commercial taxonomy of over 6000 nodes. Note that the search engine 120 and the server 204 may be coupled (directly or through the network 130) to facilitate free flow of information between them, including accessed landing pages 232 and queries submitted to reach those landing pages 232. Further details of the functioning of the server 204 will be discussed in greater detail below, beginning with the training of the landing page classifier 360 in FIG. 4.

Figure 4:
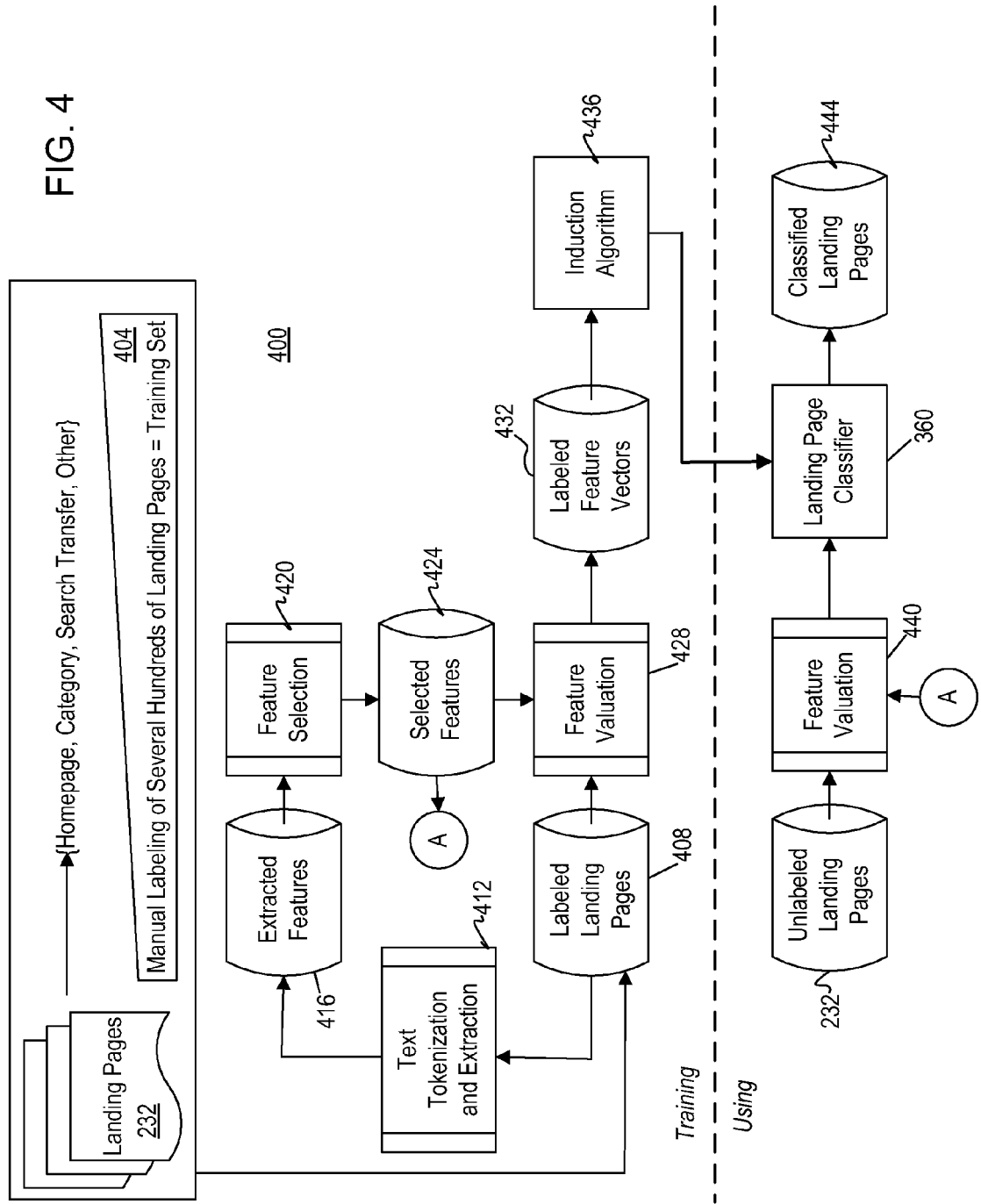
FIG. 4 is a flow chart of an exemplary method for feature extraction, selection, valuation, and machine learning with an induction algorithm to produce a landing page classifier.

FIG. 4 is a flow chart 400 of an exemplary method for feature extraction, selection, valuation, and machine learning with an induction algorithm to produce the landing page classifier 360. The top half of FIG. 4 indicates the training portion of the method. At block 404, several hundreds of landing pages 232 were manually categorized as to type to create a training set. The training set of landing pages 232 was saved into a labeled landing pages database 408, which is saved in the test web pages database 370. In a feasibility study performed, 200 unique sponsored search landing pages were used. These landing pages belonged to advertisements that were triggered by using 200 unique queries to a commercial web search engine (120). These queries were sampled out of the 800 labeled queries used for the 2005 KDD Cup. Stratified sampling was used, dividing the set of KDD Cup queries into deciles according to query frequency computed from query logs, and sampling 20 queries uniformly from each decile.

Each landing page was then inspected in isolation, noting its structure, appearance and functionality. At the end of this process, several distinct context transfer techniques were identified that advertisers use, lending to a clear definition for the taxonomy of landing pages.

Several distinct, non-overlapping classes were identified for the landing pages 232, each class representing a different context transfer technique that transitions the user 344 from the search engine result page 112 to the advertiser's landing page 232. It is interesting to note how much or how little context the advertiser 336 preserves by using each class of landing pages 232. The different classes will be discussed with reference to FIGS. 5-7.

With further reference to FIG. 4, text from the labeled landing pages are tokenized and words are extracted and counted, at block 412. The tokenization may, at least in part, be carried out by a web crawler to extract hypertext markup language (HTML) content and a page rendering program to extract text from the HTML content of each landing page 232 to be classified. The extracted features are saved in database 416. At block 420, some or all of the words are selected as features. The selected features are saved in database 424. At block 428, the selected features are assigned values using a term frequency-inverse document frequency ("tf-idf") scheme, which creates feature vectors. A tf-idf weight is a weight often used in information retrieval and text mining. This weight is a statistical measure used to evaluate how important a word is to a document in a collection or corpus. The importance increases proportionally to the number of times a word appears in the document but is offset by the frequency of the word in the corpus. Variations of the tf-idf weighting scheme are often used by search engines 120 as a central tool in scoring and ranking a document's relevance given a user query.

To illustrate tf-idf weighting, consider a set of English text documents in relation to which one desires to determine the document that is most relevant to the query "the brown cow." A simple way to start out is by eliminating documents that do not contain all three words "the," "brown," and "cow," but this still leaves many documents. To further distinguish them, one could count the number of times each term occurs in each document and sum them all together; the number of times a term occurs in a document is called its term frequency ("tf"). However, because the term "the" is so common, this will tend to incorrectly emphasize documents which happen to use the word "the" more, without giving enough weight to the more meaningful terms "brown" and "cow." Hence an inverse document frequency ("idf") factor is incorporated which diminishes the weight of terms that occur very frequently in the collection and increases the weight of terms that occur rarely.

The labeled feature vectors, which include a vector together with a class label, are stored in database 432. These are then fed, at block 436, into a machine learning (or induction) algorithm based on support vector machines ("SVM"), which learns (induces) the landing page classifier 360 of the server 204. On the bottom half of FIG. 4 displays the using phase of the method, in which the server 204 automates classification of unlabeled landing pages 232. The unlabeled landing pages 232 may come from the search engine 204 as options for when a user 344 clicks on an advertisement. At block 440, a new landing page 232 is tokenized into words, and these words define features to be valued as performed at block 428 in the training phase of the method (not duplicated below). In some embodiments, the selected features are simply received from block 424 of the training phase.

The feature vectors that result from the valuation of block 440 are fed into the landing page classifier 304 learned in the training phase of the method. The result of classification of the classifier 360 are classified landing pages 232, stored in database 444, which may be another database of the server 204 or a sub-database of the test web pages database 370.

FIG. 5 is a screenshot of an exemplary homepage 500, the top-level page of an advertiser's website. Many advertisers choose to simply display their home page 500 as a landing page 232 for their ads, often regardless of the query that triggered the ad. This approach is commonly used by either smaller, less experienced advertisers or well-known brand-name advertisers that display their homepage 500 when bidding on brand keywords. Unless the user searched for the advertiser's brand name, using the homepage 500 as a landing page 232 does not make for a strong context transfer. To illustrate this point, consider a search for the word "Toyota." If Toyota is the advertiser 336, directing the searcher to Toyota's homepage will likely satisfy the user's information need. On the other hand, any other advertiser 336 that does not have a website dedicated to Toyota cars would lose some of the context by showing a generic homepage, which does not immediately satisfy the search query (even though the relevant content may be found on the advertiser's website by following hyperlinks).

Figure 6:
FIG. 6 is a screenshot of an exemplary search transfer landing page.

FIG. 6 is a screenshot of an exemplary search transfer landing page 600. Landing pages 232 of this type result from dynamically-generated search results on the advertiser's website. This is a situation where the advertiser 336 uses the original web search query as a search query within its site, and displays the results as the ad's landing page 232. For example, given a query "California Zinfandel," an online wine store would return a landing page 232 similar to FIG. 6, dynamically displaying search results for the word "Zinfandel." In landing pages of this type, context transfer is very strong only if the query used to generate the search results corresponds to products, services or information that the website actually offers. However, many advertisers 336 that use this technique do not design their campaigns carefully enough to ensure that all phrases they bid on yield meaningful search results, in which case the context is completely lost.

Figure 7:
FIG. 7 is a screenshot of an exemplary category browse landing page.

FIG. 7 is a screenshot of an exemplary category browse landing page 700. A category browse web page 700 is a page that is not at the top level of the website (homepage 500) but could be navigated to from other pages on the website. A category browse landing page 700 leads the user 344 to a sub-section of the website that is generally related to the query. To continue from the previous example of an online wine store showing an ad for the query "California Zinfandel," here, a category browse landing page 700 might describe the Zinfandel section of the website as shown in FIG. 7. This is a technique that advertisers 336 can use both if the bid phrase refers to a general class of products or services, or a specific one. If the user 344 is looking for a general class of products, choosing a category browse landing page 700 would bring them one step closer to the product they are searching for. If the user 344 is looking for a specific product, while the advertiser only carries different but related products, showing a category page 700 allows the advertiser to present such related offerings. (A small number of pages in the dataset described a single specific product. For convenience, these single product pages were included in the category browse class.)

Additionally, some landing pages 232 did not fall comfortably in a homepage 500, a search transfer page 600, or a category browse page 700. These are standalone pages that appear to be disconnected from the rest of the website, and will be referred to under a class labeled "other." These pages generally do not have many outgoing links and there is no way to reach them from the homepage. Examples of this class are standalone forms, where the sole purpose of the page is to gather information from the user 344. Another example includes promotion pages, which supply promotional information about a product or service. These pages are similar to print ads in a newspaper, and often include phrases such as "try it now," "limited time," and "special offer."

TABLE 1

Pilot Study Class Distribution (200 web pages)

| Class | Documents Observed |
|---|---|
| Category Browse | 37.5% |
| Search Transfer | 26% |
| Homepage | 25% |
| Other | 11.5% |

Each landing page was labeled from a pilot study according to the classes described above. The distribution of labels is shown in Table 1. Since the queries in the study were sampled out of the manually-classified set for the KDD Cup, the data could be analyzed with respect to the provided classes. Each query was tagged by a human judge with up to five out of 67 possible categories (see sigkdd.org/kdd2005/kddcup.html for information about the categories and labeling procedure). An aggregate of the labels assigned by three human judges were used. Table 2 presents the breakdown of landing page types for the five most frequent query classes.

TABLE 2

Distribution of landing page types for sample query classes.

| Class | Homepage | Search Transfer | Category Browse | Other |
|---|---|---|---|---|
| Info: Companies & Industries | 45 | 52 | 69 | 17 |
| Shop: Stores & Products | 32 | 48 | 76 | 11 |
| Shop: Buying Guides & Researching | 27 | 35 | 61 | 6 |
| Info: Local & Regional | 36 | 21 | 42 | 25 |
| Online Community: Homepage | 29 | 25 | 38 | 14 |

It is interesting to note that the breakdown of landing page types for Shopping: Buying Guides & Researching and Shopping: Stores & Products follows a similar trend. It is believed, however, that advertisers 336 can do better than that by careful selection of landing page types for different queries. If an advertiser 336 knows that the user 344 is researching a product, an appropriate strategy might be to use the home page 500 in order to promote brand awareness. On the other hand, when the shopping intent is clearly focused on specific products and stores, one would assume that a more focused category browse (700) or even search transfer (600) page would be more appropriate. Another query class worth mentioning is "Online Community, Homepage." In this class, 38% of pages fall under the category browse 700 type while 29% are labeled homepage 500. One would have expected homepage 500 to be the dominant class here as it reflects the intent of the query.

A natural taxonomy of landing pages has been observed on a small set of editorially labeled data. However, in order to make meaningful claims about the impact of these findings, a larger set of landing pages 232 is required in order to label them according to the taxonomy. Unfortunately, hand labeling data is expensive and time consuming; accordingly, a landing page classifier 360 was trained as discussed above. The goal of this classifier 360 is to determine the type of landing page based on automatic analysis of its HTML content, without any human intervention. Given a sufficiently accurate classifier 360, a large corpus of landing pages may be labeled and analyzed in regards to different properties of the corpus with respect to other known metadata such as the advertisements' conversion rate.

To train a classification model, the training set of labeled landing pages 408 was employed (FIG. 4). For each landing page 232 in the training set, the classifier 360 assigns one of four labels: homepage, category browse, search transfer, or other. The other label refers to the miscellaneous landing page types that were not as prevalent in the data. By focusing on most frequent types of landing pages 232, the accuracy of predictions is increased for the most frequent classes, which account for more than 88% of the data.

The full HTML content of each landing page 232 in the dataset was extracted. Lynx, a text-based web browser was then used to extract all visible textual content from the page. The first set of features that were considered consists of empirically-observed characteristics that can be used to distinguish among the different landing-page classes. For instance, search transfer pages 600 often include words such as "search results," "found," and "matches," or a search box that is populated with the triggering bid phrase. For category browse landing pages 700, frequently observed were a list of links separated by a character such as '>', indicating the categorical hierarchy of products on the website. An example of such pattern is All Categories>Clothing and Accessories>Shoes on a landing page 700 of an advertiser bidding on the phrase "buy shoes." A homepage 500 can be identified by analyzing the landing page URL. More specifically, the overlap between the HTML of the landing page and that of the page retrieved using the base URL was computed. Characteristics of the "other" class include the ratio of form elements to text, few outgoing links, and phrases such as "special offer."

The second set of features that were used was generated with a bag-of-words approach. Expected are different classes of landing pages 232 to employ a different vocabulary. Using the frequency of keywords relative to the page size, this vocabulary was captured without imposing observational bias.

Once finished with gathering all of the features as described above, the classifier could be built using a Weka toolkit. A supervised attribute selection technique was first applied to reduce the feature space, which not only helped prevent over fitting but also reduced the feature extraction time for landing pages classified in future experiments. A Support Vector Machine (SVM) model was trained using Weka's sequential minimal optimization (SMO) implementation. With 10-fold cross validation on the training data, the classifier 360 accurately predicted the class label for 83% of the examples.

Since some of the features were designed based on observation of the training data, an additional test was performed to ensure that the model was not over fitting. One hundred documents were sampled from the Yahoo! toolbar logs and labeled them manually. The classifier 360 was run over this test data and it correctly predicted the class label for 80% of the examples.

TABLE 3

Classifier Accuracy by Class

| Class | Precision | Recall | F-measure |
|---|---|---|---|
| Homepage | 0.917 | 0.786 | 0.846 |
| Search Transfer | 0.862 | 0.926 | 0.893 |
| Category Browse | 0.645 | 0.87 | 0.741 |
| Other | 0.5 | 0.25 | 0.333 |

TABLE 4

Classifier Confusion Matrix

| Class/Label | Homepage | Search Transfer | Category Browse | Other |
|---|---|---|---|---|
| Homepage | 33 | 2 | 6 | 1 |
| Search Transfer | 0 | 25 | 2 | 0 |
| Category Browse | 0 | 2 | 20 | 1 |
| Other | 3 | 0 | 3 | 2 |

A breakdown of the classification accuracy by class can be seen in Table 3 and the confusion matrix is displayed in Table 4. The confusion matrix of Table 4 refers to Precision and Recall. Precision can be seen as a measure of exactness or fidelity, whereas recall is a measure of completeness. In a statistical classification task such as presented herein, the precision for a class is the number of true positives (e.g., the number of items correctly labeled as belonging to the class) divided by the total number of elements labeled as belonging to the class (e.g., the sum of true positives and false positives, which are items incorrectly labeled as belonging to the class). Recall in this context is defined as the number of true positives divided by the total number of elements that actually belong to the class (e.g., the sum of true positives and false negatives, which are items which were not labeled as belonging to that class but should have been).

In a classification task, a Precision score of 1.0 for a class C means that every item labeled as belonging to class C does indeed belong to class C (but says nothing about the number of items from class C that were not labeled correctly) whereas a Recall of 1.0 means that every item from class C was labeled as belonging to class C (but says nothing about how many other items were incorrectly also labeled as belonging to class C).

Usually, Precision and Recall scores are not discussed in isolation. Instead, either values for one measure are compared for a fixed level at the other measure (e.g., precision at a recall level of 0.75) or both are combined into a single measure, such as the F-measure, which is the weighted harmonic mean of precision and recall. The F-measure can be expressed as F=2*(Precision*Recall)/(Precision+Recall).

Using the classifier 360, a previously unseen set of landing pages obtained by crawling the Yahoo! toolbar logs (from the query logs database 332) were also labeled. The set contains 20,960 landing pages that were collected by observing user clicks on sponsored search results 104. This data was collected between Jan. 18 to Jul. 20, 2008. The class distribution obtained by using the landing page classifier 360 on the toolbar data can be seen in Table 5.

TABLE 5

Class Distribution on over 20,000 Landing Pages

| Class | Documents Classified |
|---|---|
| Category Browse | 36.05% |
| Search Transfer | 22.34% |
| Homepage | 34.36% |
| Other | 7.25% |

Comparing the class distribution of the toolbar data and pilot study data, note that category browse is the most dominant class in both cases, present in roughly the same percentage of documents. The homepage class, on the other hand, is much more prevalent in the toolbar data than the pilot study data. Since the classifier 360 achieves over 90% precision on the homepage class, it is believed that the larger percentage of homepages 500 in the toolbar data is due to the way in which the data was collected. Each landing page 232 in the toolbar dataset was displayed in response to an advertisement click.

Conversion is at the core of the value added by the search engine 120 for all the participants in the search advertising process. The ultimate goal for the advertisers 336 is return on their investment in sponsored search advertising, which depends directly on the conversion rate of the users 344 brought by the ads placed in the sponsored search systems. For the user 344, a conversion is an indication that the user 344 has satisfied the intent of the query. Satisfied advertisers 336 and users 344 would make the business model of the search engine 120 more viable by increased bids and more opportunity to earn revenue.

A conversion may be defined as a visit where the user 344 performs the desired action, which can take many different forms ranging from further browsing, user registration, to product sales. For a given landing page URL of a given ad campaign, conversion rate is the percentage of visitors that took the desired action, e.g., the ratio between the number of conversions and number of clicks associated with the landing page 232.

An opt-in conversion dataset used for the study includes conversion information for one month in 2008 provided by participating advertisers 336. The data is collected by adding http redirects to the links in the advertiser's site that represent conversion events (e.g., a 'Buy' button). To do the analysis the conversion events were aggregated into data entries, each with the following fields: (1) landing page URL; (2) bid phrase: the query that led to a visit to the URL; (3) number of clicks: the number of visits to this URL; and (4) number of conversions at this URL.

The dataset was augmented with the following information for each entry (note that the number of entries in the dataset was gradually reduced in the process). (1) Landing page type. The landing page was crawled if available through the UNIX command, wget. The Lynx program was then used to convert the HTML content into textual format, and then the automatic landing page type classifier 360 was applied on the resulting text documents. An entry was removed if the URL was no longer available at the time of the crawling or if the crawled page did not contain textual content. (2) Query frequency. The frequency of the query associated with the landing page URL was extracted in Yahoo! Web search log 3. (3) Query class. Optionally included was the class label of the query predicted by an automatic query classifier with respect to a commercial taxonomy of over 6000 nodes whenever it was available.

The final dataset consists of over 31,000 unique queries and landing page URLs. It also covers a broad range of queries. If the top-level class labels are tallied in the query taxonomy predicted for each query, the queries in the dataset cover a broad range of topics.

The study conducted sought to find any correlation between the type of landing page used and the corresponding conversion rate. To this end, the average conversion rate for a group of URLs (U) is defined. To compute the average of the conversion rates (cr) associated with all URLs u∈U, one possibility is to define it as $$\frac{\sum_{u \in U} cr(u)}{|U|},$$

treating the conversion rate for each URL equally, regardless of the number of clicks received by that URL (click(u)). The conversion rates of URLs with more clicks, however, are more reliable estimates than the conversion rates of URLs with only one click. Given the differences in confidence in the conversion rates computed from URLs with different number of clicks, for the weighted average of the conversion rates, the average conversion rate of U is taken as $$avg. \ cr(U) = \frac{\sum_{u \in U} cr(u) * \log(\text{click}(u))}{\sum_{u \in U} \log(\text{click}(u))} \quad (1)$$

and rather than reporting the raw numbers, the relative average conversion rate for each given group is reported as $$rel. \ avg. \ cr(U) = \frac{avg.cr(U) - avg.cr(D)}{avg.cr(D)} \quad (2)$$

where D denotes the entire dataset.

Note that the above measure effectively ignores the conversion rates of URLs that received only one click. While it is possible to define a modified weight function to avoid this, it is reasonable to exclude URLs with too few clicks and use this measure as written.

Table 6 summarizes the overall break-down of different types of landing pages in the dataset as well as the relative average conversion rates associated with each landing page type on the opt-in dataset.

TABLE 6

| Class C | Distribution | Rel. avg. cr (C) |
|---|---|---|
| Category Browse | 44.8% | −0.15 |
| Search Transfer | 33.7% | −0.55 |
| Homepage | 13.7% | 1.00 |
| Other | 7.8% | 1.04 |

As seen, category browse and search transfer classes are the dominant choices, although the average conversion rates for them are lower than the average of the entire dataset. This does not necessarily mean that advertisers do not know what is best for them. Depending on the advertisers' (varying) definition of conversions, it is possible that certain landing page types are easier to achieve conversions. For instance, an advertiser 336 using a landing page 232 of the "other" class may consider a membership registration as a conversion, while an advertiser 336 using a landing page 232 of the "search transfer" class may expect a product sale as a conversion. Clearly it is more difficult to achieve a conversion for the latter case. That said, this does not guarantee higher satisfaction from the first advertiser. An advertiser 336 might be content with a lower sales conversion rate than a registration conversion rate if there is higher profit associated with the former.

With that caveat in mind, it is still interesting to explore whether different types of landing pages 232 are more appropriate for different types of queries using the conversion rates reported by the advertisers 336.

Figure 8B:
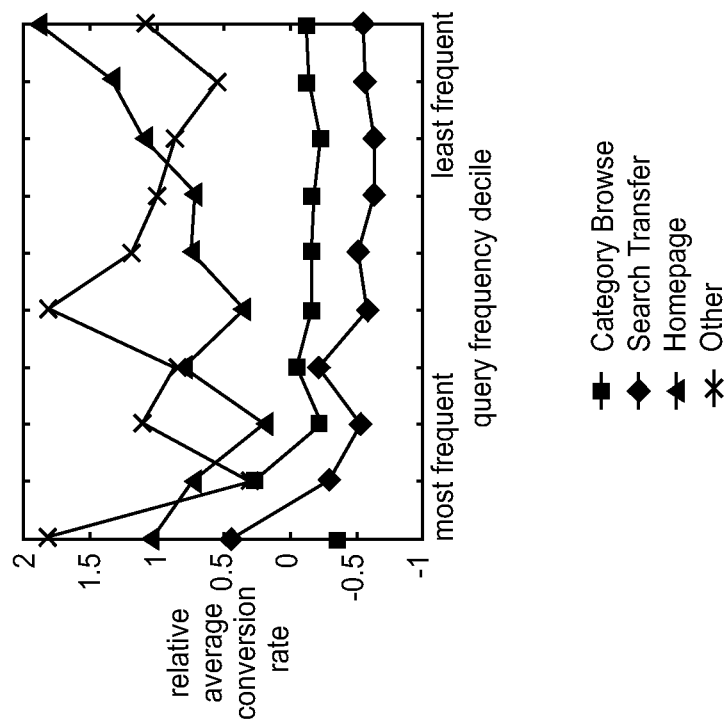
FIGS. 8A and 8B are graphs displaying landing page type frequency and relative average conversion rate, respectively, based on query frequency.
Figure 8A:
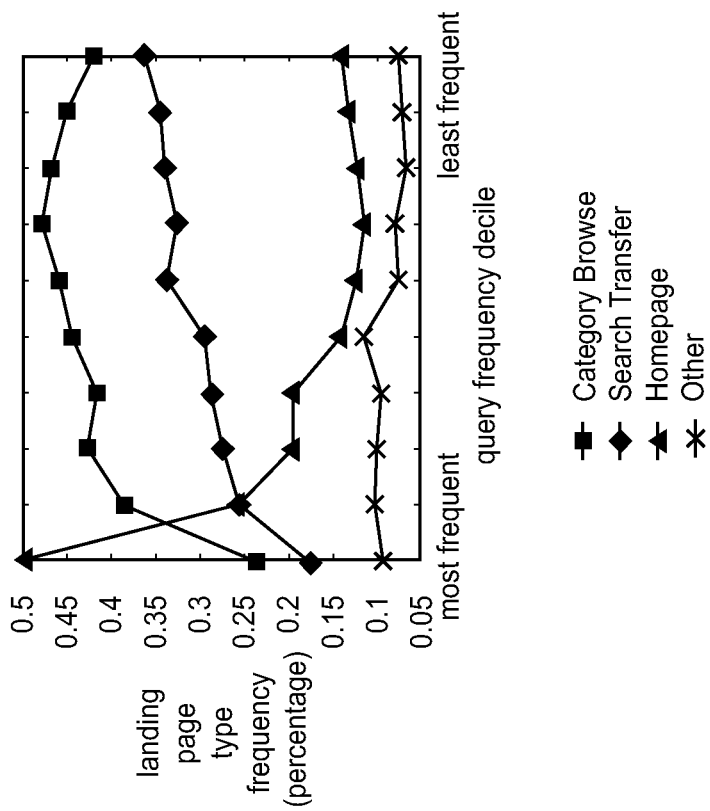
Figure 8D:
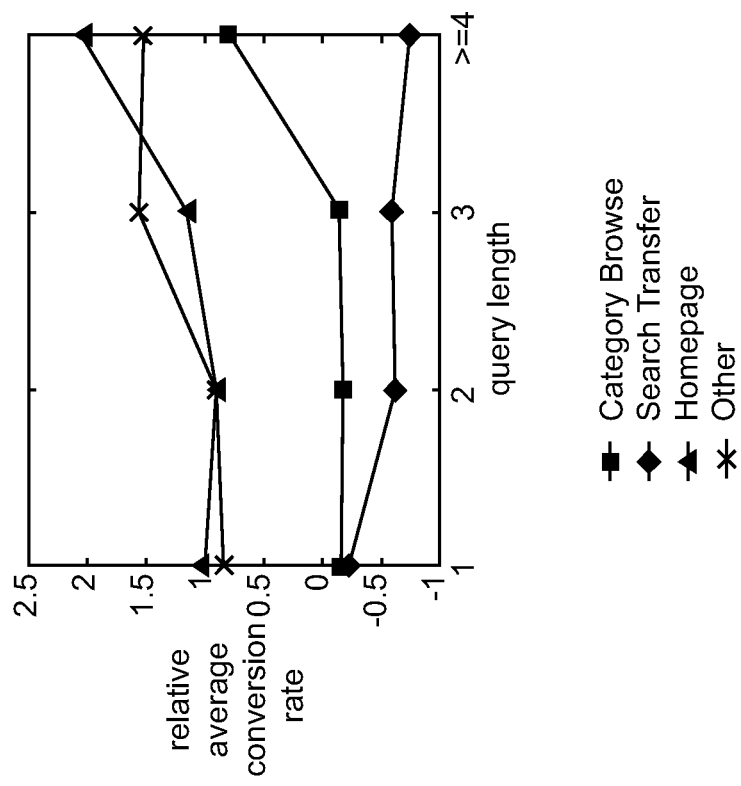
FIGS. 8C and 8D are graphs displaying landing page type frequency and relative average conversion rate, respectively, based on query length.
Figure 8C:
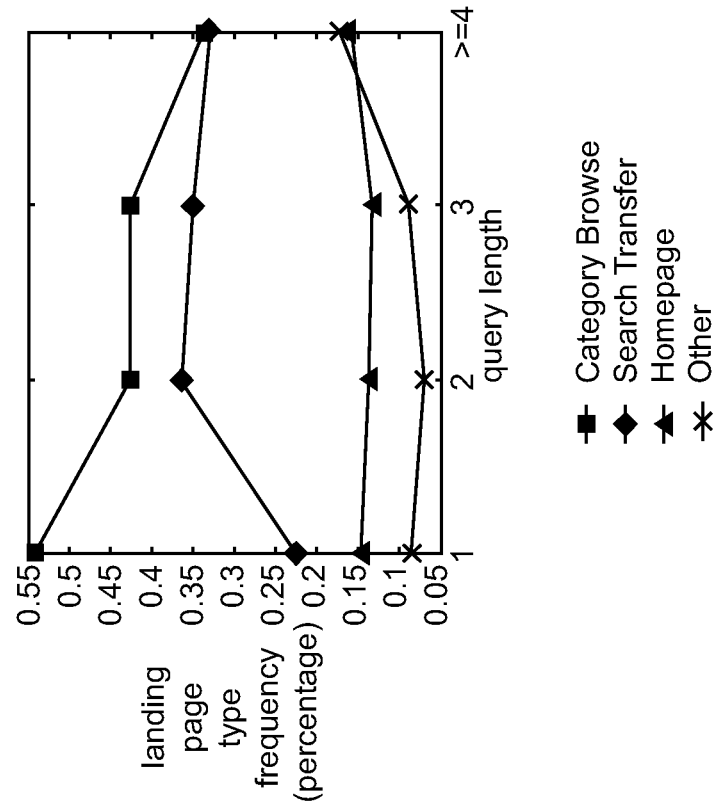
Figure 8F:
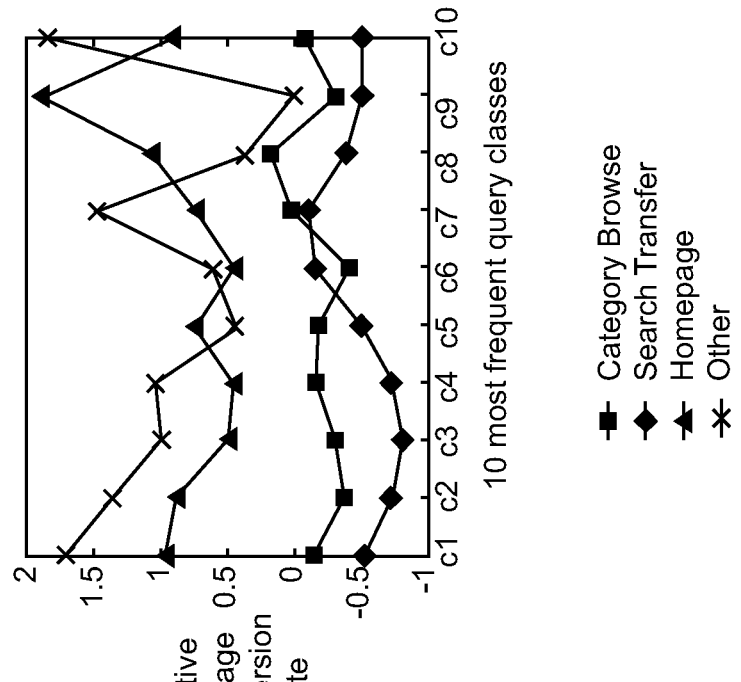
FIGS. 8E and 8F are graphs displaying landing page type frequency and relative average conversion rate, respectively, based on the 10 most frequently-used query classes.
Figure 8E:
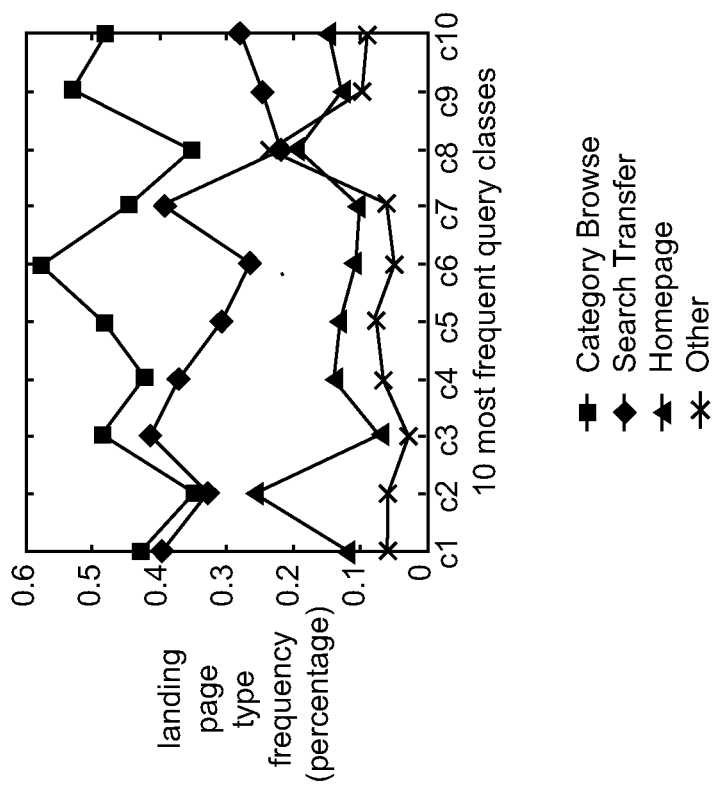

FIGS. 8A and 8B are graphs displaying landing page type frequency and relative average conversion rate, respectively, based on query frequency. These present the usage and conversion information for queries with different search log frequencies. FIGS. 8C and 8D are graphs displaying landing page type frequency and relative average conversion rate, respectively, based on query length. FIGS. 8E and 8F are graphs displaying landing page type frequency and relative average conversion rate, respectively, based on the 10 most frequently-used query classes.

No matter how the queries are grouped, one consistent trend is that the "other" class is the least frequently used landing page type, with the highest or the second highest average conversion rate. In other words, advertisers 336 do not tend to resort to using this type of landing page 232, but when they do, they are relatively contented with the results (compared to the other three landing page types). As discussed earlier, as the "other" class includes registration pages and the like, the conversions can be less comparable. The following analysis will focus on the three more dominant classes.

Similar trends are observed as seen on the entire dataset: category browse and search transfer classes are used more often, but typically achieve lower conversion rates. And, the relative orders in terms of both usage and conversion are mostly consistent regardless of the topics (or classes) of the queries (FIGS. 8E and 8F). Still, closer examination reveals a number of interesting details.

First, note that homepage 500 is the dominating class used for the most frequent queries, and its usage gradually drops down as we move towards less frequent queries (FIG. 8A). Intuitively, the most frequent queries are more likely to be navigational queries or informational queries on popular brand names. Indeed, the 100 most frequent queries in this opt-in dataset were examined, in which 43 of them were found to be brand names without any specific model indicators (e.g., Nokia). In contrast, the less frequent queries, when they did include a brand name, tended to also include specific model information (e.g., 2009 Chevrolet Malibu). Not surprisingly, homepage class was used more often on frequent queries. Similarly, the usage of the category browse and search transfer classes gradually increase when observing less frequent queries, with the usage of category browse tipping off slightly towards the least frequent queries (reducing the gap with search transfer in the "usage market share"), indicating that as the queries become rarer, it becomes more difficult to pair them up with one of the pre-existing pages on the site (e.g., a category browse page 700) and is more convenient to resort to a search transfer page 600.

There is an interesting steady increase in the average conversion rate for the homepage class as the queries become rarer (FIG. 8B). One possible explanation is if an appropriate homepage 500 can be advertised for a rare query, either the advertiser is easier to please (e.g., happy with getting a bit of branding) or the user is easier to impress. The conversion rates of the other two classes remain more or less constant for the last five deciles of query frequency.

Another handle on query specificity is the length of the query. Longer queries are more likely to be more specific (e.g., "100 polyester tablecloth" as opposed to "tablecloth"), although query length is not always a precise predictor of specificity (e.g., "asd2625kew4" vs. "Christmas dinner recipe"). Note that the queries in the dataset do not cover a broad range of lengths, owing to the short average query length used in Web search today. Still, the difference between the usages of the category browse and search transfer classes are the widest for one-word queries, where the users 344 are more likely to be looking for information at the category level (FIG. 8C). Note that a similar increase in average conversion rate can be observed for the homepage class as the queries get longer and thus more likely to be specific (FIG. 8D). Among the three dominant classes, search transfer landing pages 600 consistently yield the lowest average conversion rates, regardless of to which subset of queries they were compared. This may be because search transfer pages 600 are inherently ineffective at achieving conversions. Or, it may be because advertisers 336 use category browse pages 700 when they have appropriate pre-existing pages that address the query, and resort to search transfer pages 600 when the query is too rare and it is more difficult to achieve conversion on these queries. (Recall that an increased usage of search transfer pages on rare queries was observed.) If the first hypothesis is true, then when a query has two different types of landing pages 232 associated with it, the search transfer one should be more likely to lose to the other type when comparing their conversion rates. To address this question, the following experiments were conducted.

Different ad campaigns that target the exact same queries were first studied. If advertisers 336 used different landing page types for the same query, which type(s) tended to have higher conversion rates? Results are summarized in Table 7(a) and (b). It turned out that most queries were associated with only one landing page in this dataset, and conversions for multiple landing pages were reported for only about 600 queries. In order to obtain more reliable statistics, the comparison to different landing page types used for related queries was relaxed, wherein two queries were considered related if they had at least one word in common and they shared the same query class (top one prediction from the query classifier). Results from the relaxed comparison study are shown Table 7(c) and (d).

TABLE 7

| | C. Browse | S. Transfer | Homepage | Other |
|---|---|---|---|---|
| (a) Click Comparison (exact same query): | | | | |
| C. Browse | — | 112:176 | 72:50 | 33:31 |
| S. Transfer | 176:112 | — | 46:52 | 21:17 |
| Homepage | 50:72 | 52:46 | — | 41:31 |
| Other | 31:33 | 17:21 | 31:41 | — |
| (b) Conversion Rate Comparison (exact same query): | | | | |
| C. Browse | — | 17:57 | 37:13 | 14:11 |
| S. Transfer | 57:17 | — | 18:6 | 9:6 |
| Homepage | 13:37 | 6:18 | — | 13:13 |
| Other | 11:14 | 6:9 | 13:13 | — |
| (c) Click Comparison (related queries): | | | | |
| C. Browse | — | 1514:2332 | 733:1046 | 422:752 |
| S. Transfer | 2332:1514 | — | 745:732 | 379:523 |
| Homepage | 1046:733 | 732:745 | — | 338:460 |
| Other | 752:422 | 523:379 | 460:338 | — |

TABLE 7-continued

| | C. Browse | S. Transfer | Homepage | Other |
|---|---|---|---|---|
| (d) Conversion Rate Comparison (related queries): | | | | |
| C. Browse | — | 263:824 | 450:350 | 259:278 |
| S. Transfer | 824:263 | — | 393:123 | 208:88 |
| Homepage | 350:450 | 123:393 | — | 179:228 |
| Other | 278:259 | 88:208 | 228:179 | — |

In both exact-match and relaxed-match studies, numbers reported in the i-th row and j-th column of each table encode two numbers ($w_{i,j}:l_{i,j}$), where $w_{i,j}$ denotes the number of times class i ($c_i$) out-numbers (out-performs) class j ($c_j$), and $l_{i,j}$ denotes the number of times $c_i$ out-numbered (out-performed) by $c_j$. Note that ($w_{i,j}:l_{i,j}$) is shown in bold face when $w_{i,j} > l_{i,j}$. A class whose corresponding row contains many bold-faced entries tends to win in terms of either getting the highest number of clicks or the highest conversion rate. For instance, when landing pages from the category browse and search transfer classes were used for related queries, 2332 of the times the search transfer page 600 achieved more clicks, and 824 of the times the search transfer page achieved higher conversion rates. The numbers in Table 7 consistently reveal the search transfer class to be much more likely to have a higher conversion rate when compared against a page from another class used for either the same or related queries. This suggests that the first hypothesis presented earlier is unlikely to be true: on fair comparisons search transfer landing pages 600 are quite effective at achieving conversions.

Presumably, when an advertiser 336 uses a homepage 500 as a landing page 232, they are hoping to entice users 344 to further explore the site via browsing. Compared to the other two dominant classes, the homepage class is more likely to be less targeted at the query. Will the users 344 be interested enough to continue browsing as expected, or will they lose interest and leave the site immediately upon viewing the landing page 232? (Another alternative is that the user 344 is forced into further browsing when the landing page 232 does not directly address their query.) The afore-mentioned Yahoo! Toolbar data was used to answer this question. For each landing page 232, the number of additional intra-site clicks in the same session can be extracted from the toolbar logs. If a click-based conversion is defined as a visit where additional clicks on the same site exceed a threshold (three, in the present case), an average conversion rate may then be computed.

Figure 9B:
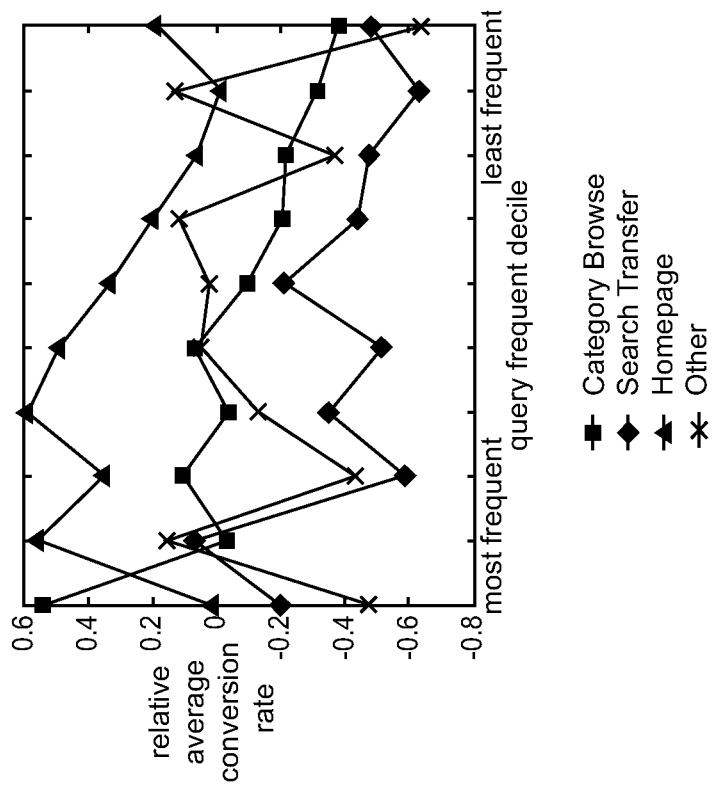
FIGS. 9A and 9B are graphs displaying landing page type frequency and relative average conversion rates, respectively, based on query frequency.
Figure 9A:
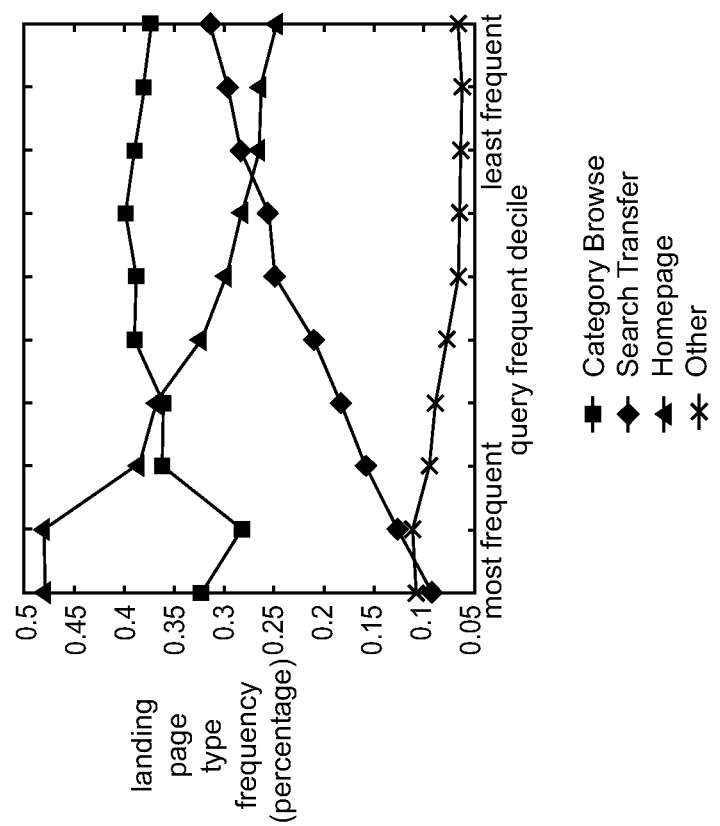

FIGS. 9A and 9B are graphs displaying landing page type frequency and relative average conversion rates, respectively, based on query frequency. As shown in FIG. 9B, overall the highest average conversion rate is observed for the homepage class. In fact, as the landing page 232 gets more specific (Homepage→Category browse→Search transfer), additional clicks are less likely to occur. Clearly, one possible explanation is that upon landing on a page already very specific to the query, a user 344 does not need as many clicks to arrive at a page that satisfies the user 344. Still, the findings of the study do show that even on rare queries, a more general-purpose landing page 232 (e.g., a homepage 500) does not defer users from further browsing: once users 344 click on the ads and arrive at the landing page 232, they do conduct further browsing if needed.

Note also that while differing in details, the general trend of how the relative order of the three dominant landing page types (in terms of both usage (FIG. 9A) and conversion (FIG. 9B)) changes across different query frequency remains consistent with findings on the opt-in dataset (FIGS. 8A and 8B).

This demonstrates that findings are not limited to one particular sample of advertisers represented by the opt-in dataset.

Herein was presented a study of context transfer in sponsored search advertising. By analyzing several hundred examples, the majority of landing pages were found to fall into three distinct classes: homepage 500, search transfer 600, and category browse 700. A landing page classifier 360 was formed through machine learning that is capable of automatically mapping landing pages 232 onto these classes. Using the classifier 360, a study of correlation between the different types of landing pages and the conversion rates of the corresponding ads was conducted. The suitability of different classes of landing pages 232 for different classes of queries was examined by partitioning data extracted from landing pages 232 according to query frequency, length, and topic. The correlation of landing page types in each data partition with ad conversion rates was then possible.

Figure 10:
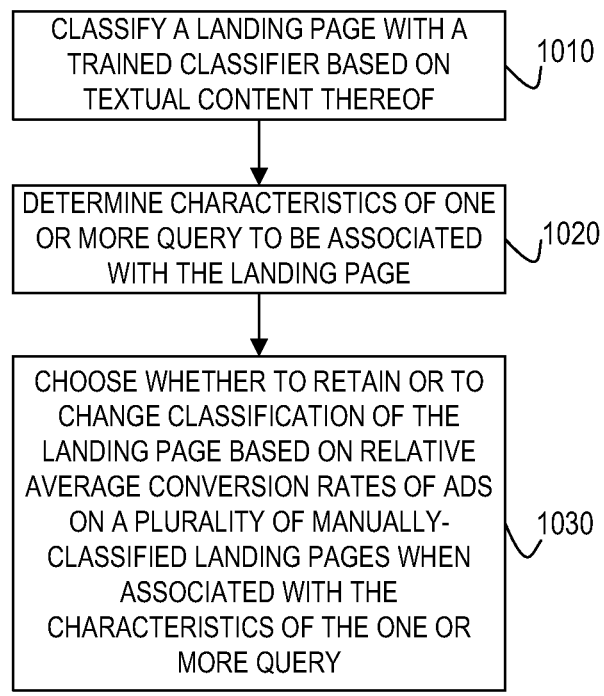
FIG. 10 is a flow chart of an exemplary method for determining a type of landing page to which to transfer web searchers that enter a particular query.

FIG. 10 is a flow chart of an exemplary method for determining a type of landing page to which to transfer web searchers that enter a particular query. At block 1010, the method classifies a landing page as one of a plurality of landing page classes with a trained classifier of a computer based on textual content of the landing page. At block 1020, the computer determines characteristics of one or more query to be associated with the landing page. At block 1030, the computer is used to choose whether to retain or to change classification of the landing page to be associated with the one or more query based on relative average conversion rates of advertisements on a plurality of manually-classified landing pages when associated with the characteristics of the one or more query.

Figure 11:
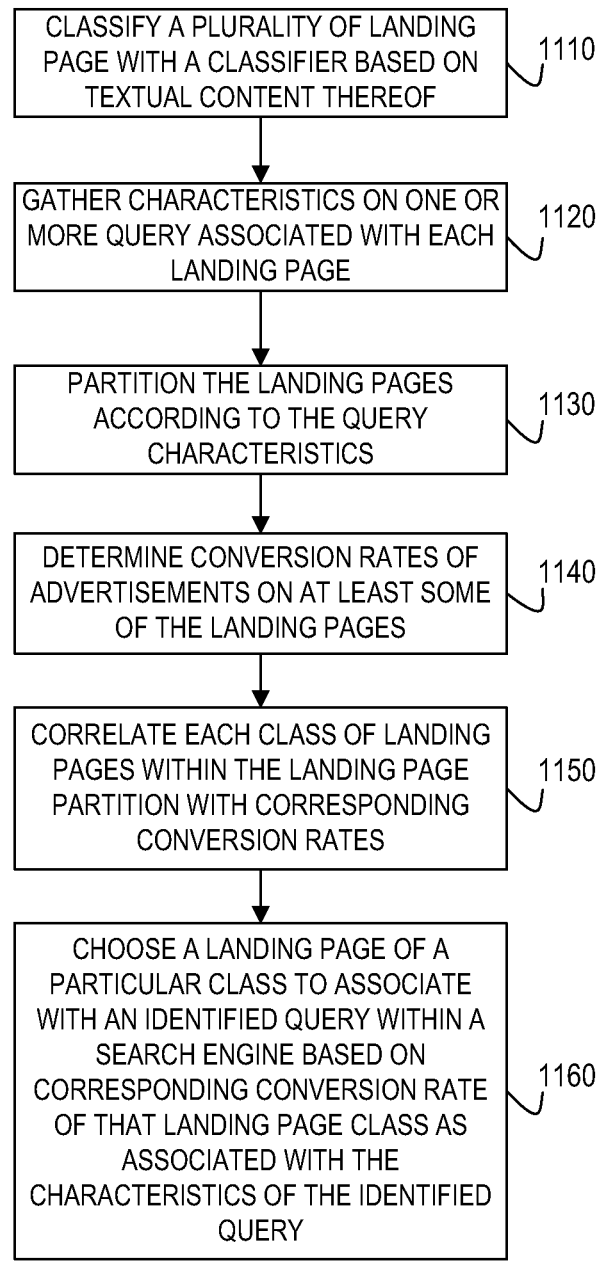
FIG. 11 is a flow chart of another exemplary method for determining a type of landing page to which to transfer web searchers that enter a particular query.

FIG. 11 is a flow chart of another exemplary method for determining a type of landing page to which to transfer web searchers that enter a particular query. At block 1110, the method classifies each of a plurality of landing pages into one of a plurality of classes with a classifier of a computer based on textual content of each of the plurality of landing pages. At block 1120, with the computer characteristics are gathered on one or more query associated with each landing page. At block 1130, by the computer the landing pages are partitioned according to a plurality of query characteristics. At block 1140, by the computer the conversion rates of advertisements are determined on at least some of the plurality of landing pages. At block 1150, with the computer, the plurality of classes of landing pages within each landing page partition are correlated with corresponding conversion rates. At block 1160, a landing page of a particular class is chosen to associate with an identified query within a search engine based on the corresponding conversion rate of that landing page class as associated with the characteristics of the identified query.

In the foregoing description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A computer-implemented method for determining a type of landing page to which to transfer web searchers that enter a particular query, each query related to a landing page that links from an advertisement, the method comprising:

extracting, by a computer, content of each of a plurality of landing pages to be classified by a web crawler of a classifier, the content comprising words of the landing page;

extracting, by a computer, text from the content by a page rendering program of the classifier;

establishing, by a computer, a feature space based on the extracted text, representing the extracted landing page;

reducing, by a computer, the feature space by applying a supervised attribute selection technique to the classifier; and training, by a computer, a machine learning model of the classifier using a learning algorithm;

classifying, by a computer, a target landing page as one of a plurality of landing page classes with the classifier trained by the machine learning model;

determining, by a computer, characteristics of one or more query;

associating the target landing page with the one or more query based on the class of the landing page being related to the characteristics of the one or more query; and choosing, by a computer, whether to retain or to change classification of the target landing page associated with the one or more query based on relative average conversion rates of advertisements on a plurality of previously-classified landing pages when associated with the characteristics of the one or more query, wherein the previously-classified landing pages are different than the landing page, and wherein relative average conversion rates comprise average conversion rates that result for respective classified type of landing page over a period of time.

2. The method of claim 1, wherein the classes comprises at least one of homepage, search transfer, category browse, miscellaneous, or another category.

3. The method of claim 1, wherein the query characteristics comprise one or more of query frequency, query length, and query topic, wherein the query topic comprises a query class predicted by an automatic query classifier with respect to a commercial taxonomy.

4. The method of claim 1, wherein the classification by the classifier is based on feature extraction comprising:

observing particular characteristics on each landing page to distinguish among the plurality of landing page classes; and detecting particular words within the text of each landing page to be correlated with the plurality of landing page classes.

5. The method of claim 1, wherein the content extracted by the web crawler is hypertext markup language (HTML) content.

6. A computer-implemented method for determining a type of landing page to which to transfer web searchers that enter a particular query, the queries related to landing pages that link from respective advertisements, the method comprising:

extracting, by a computer, content of each of a plurality of landing pages to be classified by a web crawler of a classifier, the content comprising words of the landing page;

extracting, by a computer, text from the content by a page rendering program of the classifier;

establishing, by a computer, a feature space based on the extracted text, representing the extracted landing page;

reducing, by a computer, the feature space by applying a supervised attribute selection technique to the classifier; and training, by a computer, a machine learning model of the classifier using a learning algorithm;

classifying, by a computer, each of a plurality of target landing pages into one of a plurality of classes with the classifier trained by the machine learning model using content extracted from each of the plurality of target landing pages, wherein the plurality of classes comprise homepage, search transfer, and category browse;

gathering, by a computer, characteristics on one or more query associated with each target landing page;

partitioning, by a computer, the plurality of target landing pages according to a plurality of query characteristics;

determining, by a computer, conversion rates of advertisements on at least some of the plurality of target landing pages;

correlating, by a computer, the plurality of classes of landing pages within each landing page partition with corresponding conversion rates; and choosing a target landing page of a particular class to associate with an identified query within a search engine based on the corresponding conversion rate of that target landing page class as associated with the characteristics of the identified query.

7. The method of claim 6, wherein the classes further comprise miscellaneous, wherein miscellaneous includes landing pages not falling into a classification of homepage, search transfer, or category browse.

8. The method of claim 6, wherein the plurality of query characteristics comprise one or more of query frequency, query length, and query topic.

9. The method of claim 8, wherein the query topic comprises a query class predicted by an automatic query classifier with respect to a commercial taxonomy.

10. The method of claim 6, wherein the content extracted by the web crawler is hypertext markup language (HTML) content.

11. The method of claim 10, wherein the classification by the classifier is based on feature extraction comprising:

observing particular characteristics on the landing pages to distinguish among the plurality of landing page classes; and detecting particular words within the text of each landing page to be correlated with the plurality of landing page classes.

12. The method of claim 10, wherein the machine learning model comprises a support vector machine model and wherein the learning algorithm comprises a sequential minimal optimization (SMO) algorithm of the support vector machine model.

13. A server for determining a type of landing page to which to transfer web searchers that enter a particular query, each query related to a landing page that links from an advertisement, the server comprising:

a landing page classifier to
extract content of each of a plurality of landing pages to be classified, the content comprising words of the landing page;
extract text from the content;
establish a feature space based on the extracted text, representing the extracted landing page;
reduce the feature space by applying a supervised attribute selection technique; and
conduct classification training with a computer under a machine learning model using a learning algorithm; and
classify a target landing page as one of a plurality of landing page classes;

a query classifier coupled with the landing page classifier to determine characteristics of one or more query such that the one or more query is associated with the target landing page based on the class of the landing page being related to the characteristics of the one or more query; and a processor coupled with the landing page and query classifiers to choose whether to retain or to change classification of the target landing page associated with the one or more query based on relative average conversion rates of advertisements on a plurality of previously-classified landing pages when associated with the characteristics of the one or more query, wherein the previously-classified landing pages are different than the landing page, and wherein relative average conversion rates comprise average conversion rates that result for respective classified type of landing page over a period of time.

14. The server of claim 13, wherein the classes comprises at least one of homepage, search transfer, category browse, miscellaneous, or another category, wherein the query characteristics comprise one or more of query frequency, query length, and query topic, and wherein the query topic comprises a query class predicted by an automatic query classifier with respect to a commercial taxonomy.

15. The server of claim 13, wherein the processor observes particular characteristics on the target landing page to distinguish among the plurality of landing page classes, the server further comprising:

an extractor to extract particular words within the text of each target landing page to be correlated as features with the plurality of landing page classes.

16. The server of claim 13, wherein the classifier comprises a web crawler to extract hypertext markup language (HTML) content and a page rendering program to extract text from the HTML content of each landing page to be classified, wherein the machine learning model comprises a support vector machine model, and wherein the learning algorithm comprises a sequential minimal optimization (SMO) algorithm of the support vector machine model.

17. A computer-implemented system for determining a type of landing page to which to transfer web searchers that enter a particular query, the queries related to landing pages that link from respective advertisements, the system comprising:

a landing page classifier to extract content of each of a plurality of landing pages to be classified, the content comprising words of the landing page;

extract text from the content;

establish a feature space based on the extracted text, representing the extracted landing page;

reduce the feature space by applying a supervised attribute selection technique; and conduct classification training with a computer under a machine learning model using a learning algorithm; and classify each of a plurality of target landing pages into one of a plurality of classes using content extracted from each of the target plurality of landing pages, the content comprising words of the landing page, wherein the plurality of classes comprise homepage, search transfer, and category browse;

a processor coupled with a memory and with a communication interface;

a query logs database coupled with the processor, wherein the processor is configured to:

gather from the query logs database characteristics on one or more query associated with each target landing page;

partition the target landing pages according to a plurality of query characteristics;

retrieve conversion rates of advertisements on at least some of the plurality of target landing pages;

correlate the plurality of classes of landing pages within each target landing page partition with corresponding conversion rates; and choose a target landing page of a particular class to associate with an identified query within a search engine based on the corresponding conversion rate of that landing page class as associated with the characteristics of the identified query.

18. The system of claim 17, wherein the classes further comprise miscellaneous, or another category, and wherein the query characteristics comprise one or more of query frequency, query length, and query topic.

19. The system of claim 18, wherein the query topic comprises a query class predicted by an automatic query classifier with respect to a commercial taxonomy.

20. The server of claim 17, wherein the classifier comprises a web crawler to extract hypertext markup language (HTML) content and a page rendering program to extract text from the HTML content of each landing page to be classified, wherein the processor observes particular characteristics on each landing page to distinguish among the plurality of landing page classes, the server further comprising:

an extractor to extract particular words within the text of each landing page to be correlated as features with the plurality of landing page classes.

* * * * *